United States Patent [19]

Ishizuka

[11] Patent Number: 5,708,512
[45] Date of Patent: Jan. 13, 1998

[54] FACSIMILE APPARATUS AND RECORDING METHOD THEREIN

[75] Inventor: Haruo Ishizuka, Tokyo, Japan

[73] Assignee: Canon Kabushiki Kaisha, Japan

[21] Appl. No.: 473,993

[22] Filed: Jun. 7, 1995

Related U.S. Application Data

[63] Continuation of Ser. No. 66,919, May 26, 1993, abandoned, which is a continuation of Ser. No. 549,122, Jul. 6, 1990, abandoned.

[30] Foreign Application Priority Data

Jul. 7, 1989 [JP] Japan ................... 1-173954

[51] Int. Cl.⁶ ........................................ H04N 1/40
[52] U.S. Cl. .................. 358/449; 358/448; 358/451; 358/462; 358/481; 347/254
[58] Field of Search .................. 358/439, 448, 358/449, 451, 480, 481, 483, 462; 346/108, 160; 347/129, 131, 132, 254

[56] References Cited

U.S. PATENT DOCUMENTS

| | | |
|---|---|---|
| 4,578,689 | 3/1986 | Spencer et al. .................. 346/160 |
| 4,612,555 | 9/1986 | Hongou et al. .................. 346/160 |
| 4,731,658 | 3/1988 | Koseki .................. 358/449 |
| 4,772,955 | 9/1988 | Kurahayashi et al. |
| 4,789,900 | 12/1988 | Takahashi .................. 358/439 |
| 4,814,894 | 3/1989 | Yoshida .................. 358/449 |
| 4,882,630 | 11/1989 | Yamaguchi et al. .................. 358/434 |
| 4,922,272 | 5/1990 | Wakamatsu et al. .................. 346/160 |
| 5,019,916 | 5/1991 | Ogura .................. 358/449 |
| 5,038,218 | 8/1991 | Matsumoto .................. 358/449 |
| 5,045,869 | 9/1991 | Isaka et al. .................. 358/296 |
| 5,355,231 | 10/1994 | Murata .................. 358/448 |
| 5,493,420 | 2/1996 | Kuwamoto et al. .................. 358/451 |

Primary Examiner—Jeffery Hofsass
Assistant Examiner—Edward Lefkowitz
Attorney, Agent, or Firm—Fitzpatrick, Cella, Harper & Scinto

[57] ABSTRACT

A facsimile apparatus receives image information and recording the image information by use of a laser-beam printer. In a case where the document size of the received image information is larger than the size of the recording paper, the recording resolution of the laser-beam printer in each of main-scanning and sub-canning directions is changed and set, and recording of the received image information is performed at the set resolution.

7 Claims, 6 Drawing Sheets

FACSIMILE APPARATUS AND RECORDING METHOD THEREIN

This application is a continuation of application Ser. No. 08/066,919 filed May 26, 1993 abandoned, which is a continuation of application Ser. No. 07/549,122, filed Jul. 6, 1990 abandoned.

BACKGROUND OF THE INVENTION

1. Field of the Invention

This invention relates to a facsimile apparatus in which a laser-beam printer (LBP), for example, is used as an output unit, and to a method of printing in such a facsimile apparatus.

2. Description of the Prior Art

When the size of a document to be transmitted is larger than the size of the recording paper on the receiving side in a facsimile apparatus according to the prior art, image data processing such as thinning out the image information is performed before transmission on the transmitting side and the resulting image information conforming to the size of the recording paper on the receiving side is then transmitted.

However, since the image information is reduced and data compressed on the transmitting side in order to conform to the size of the recording paper on the receiving side, a deterioration in image quality is caused by lack and deformation of the image data.

SUMMARY OF THE INVENTION

An object of the present invention is to provide a facsimile apparatus, as well as a method of recording therein, in which a deterioration in image quality can be prevented by changing and setting resolution and then performing recording in conformity with image size without executing image data processing.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Figure 1:
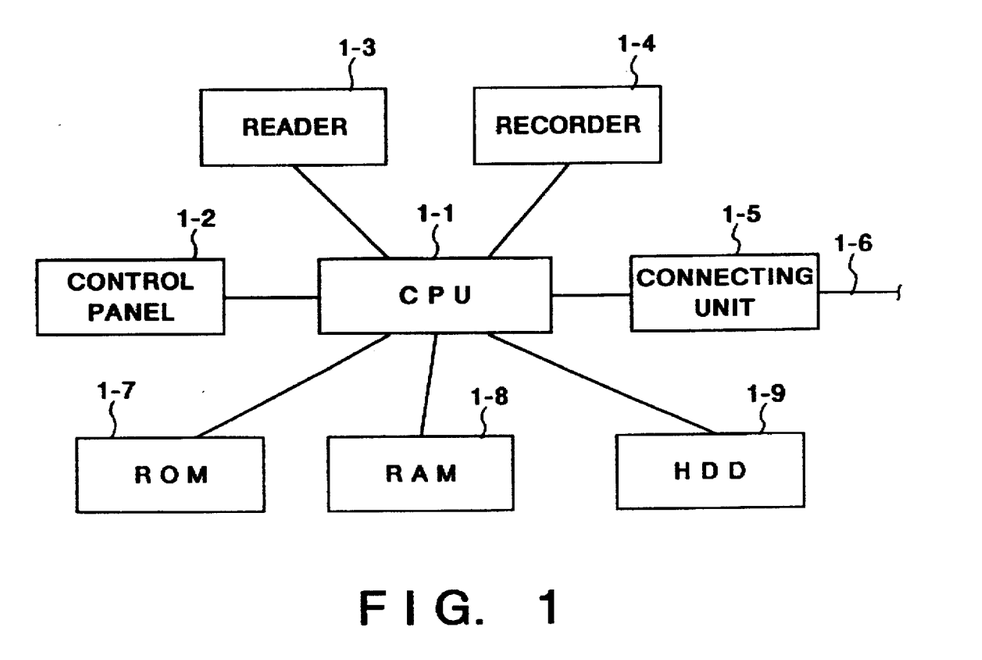
FIG. 1 is a block diagram showing the construction of a facsimile apparatus according to an embodiment of the present invention.

FIG. 1 is a block diagram showing the construction of a facsimile apparatus according to an embodiment of the present invention.

As shown in FIG. 1, an embodiment of a facsimile apparatus according to the present invention includes a CPU 1-1, which comprises a microprocessor element or the like, for performing various control operations in the apparatus, a control panel 1-2 at which inputs are made to instruct the operation of the facsimile apparatus, and which displays various information, a document reader 1-3 for reading an image from a document, a recorder 1-4 for outputting the image, a connecting unit (such as a modem or DSU) 1-5 for connecting the facsimile apparatus to a communication network, a communication line 1-6, a ROM 1-7 which stores a control program executed by the CPU 1-1, a RAM 1-8 serving as a main memory for temporarily storing various data as well as image information, and a hard disk drive (HDD) 1-9 for storing image information.

Figure 2:
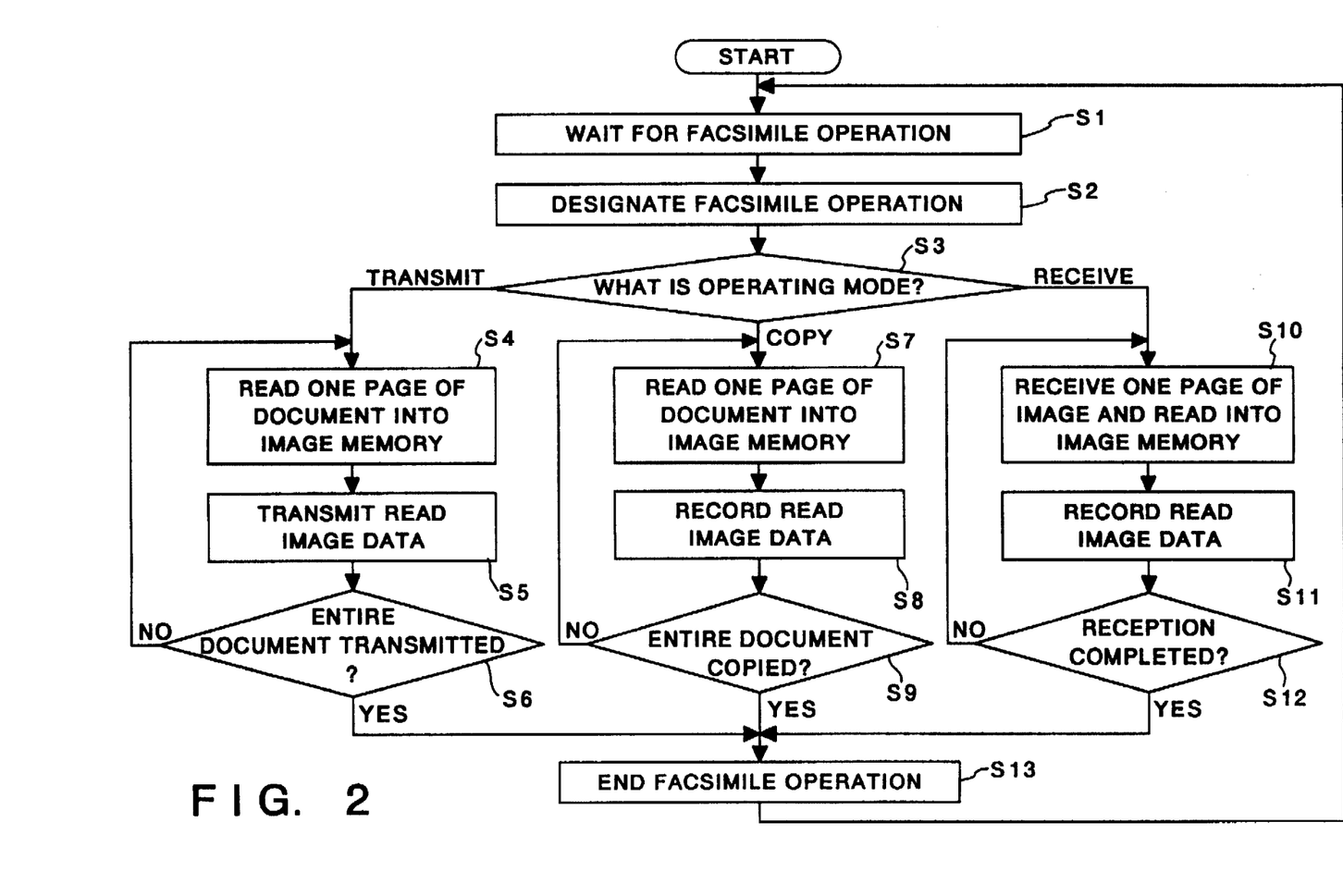
FIG. 2 is a flowchart showing the operation of the facsimile apparatus of the present embodiment.

The basic operation of the facsimile apparatus will now be described in accordance with the flowchart shown in FIG. 2.

Following the start of operation, the facsimile apparatus enters a standby state (step S1). When a start key or the like on the control panel 1-2, described below, is pressed by the operator, or when reception is designated by an incoming call (step S2), the CPU 1-1 determines the operating mode (step S3). In dependence upon the result of the determination, transmission (steps S4 through S6), copying (steps S7 through S9) or reception (steps S10–S12) is executed. When the particular operation ends (step S13), the apparatus returns to the standby state. At the time of this operation, image data are temporarily read/written into or from the RAM 1-8 used as a data buffer, and the image data are further read/written into or from the HDD 1-9 serving as an image memory.

Figure 3:
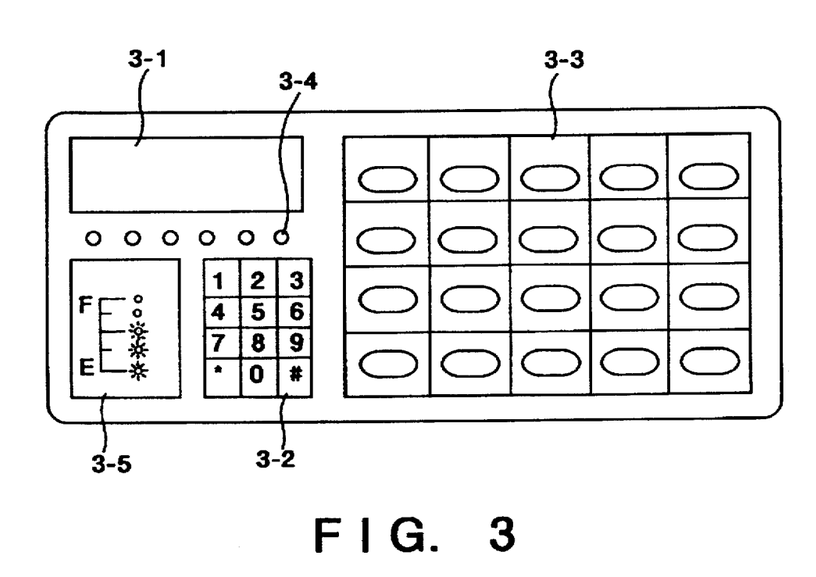
FIG. 3 is a detailed diagram showing the control panel of the facsimile apparatus in the present embodiment.

FIG. 3 is a diagram showing the details of the control panel 1-2 of the facsimile apparatus. The control panel 1-2 has a display 3-1, numeric keys 3-2, single-touch keys 3-3, function keys 3-4, and an indicator 3-5 showing the amount of recording paper left.

Figure 4:
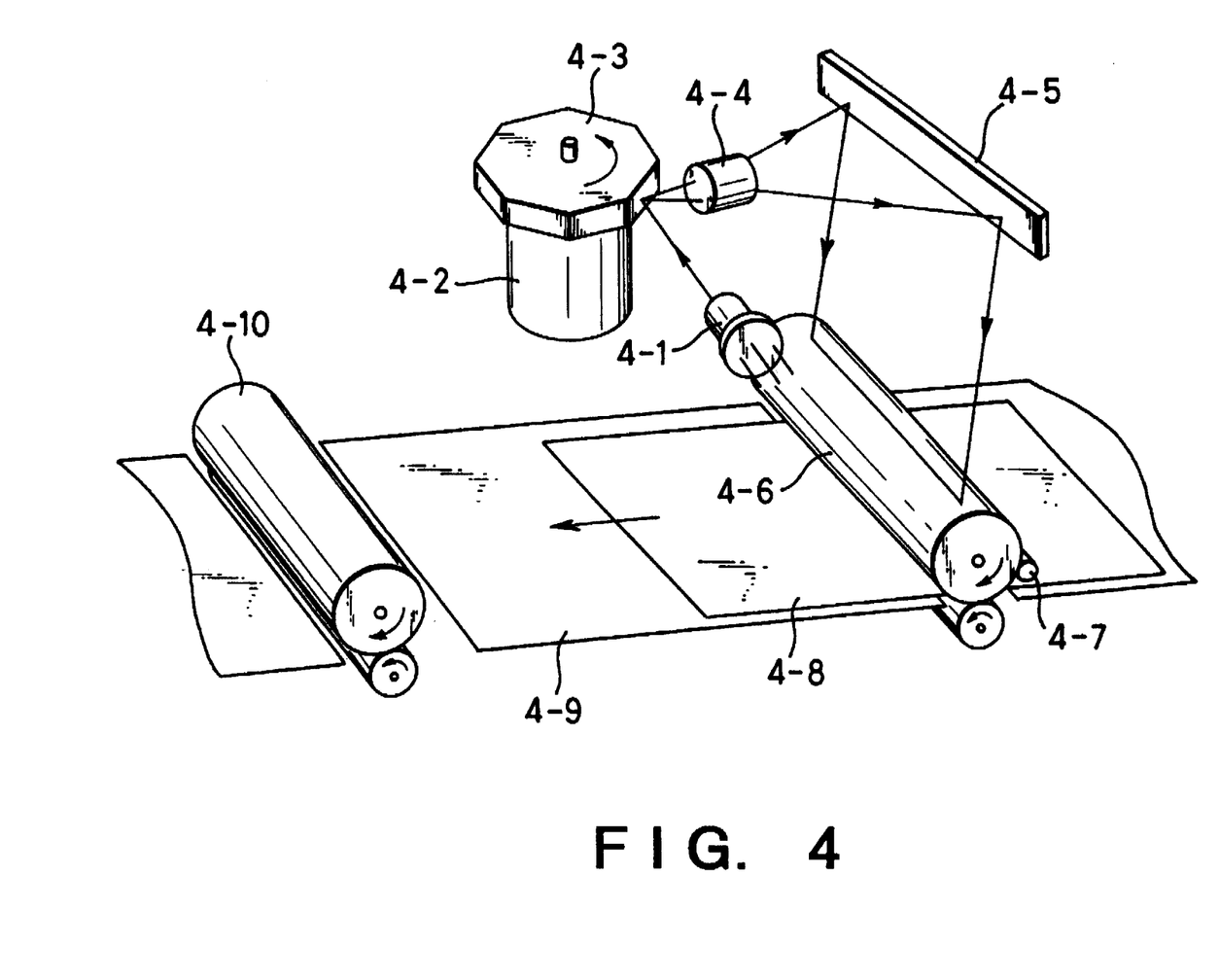
FIG. 4 is a diagram showing the construction of an LBP mechanism in the facsimile apparatus of the present embodiment.

In the present embodiment, the basic operation of a laser-beam scanning electrophotographic printer (LBP) used as the printer 1-4 will now be described with reference to FIG. 4 showing the general construction of the printer mechanism.

As shown in FIG. 4, the printing mechanism includes a semiconductor laser 4-1 for intermittently emitting a laser beam in accordance with black and white dots of image data to be recorded, a motor 4-2 for rotating a polygon mirror 4-3, a focusing system 4-4, a mirror 4-5, a photosensitive drum 4-6, a developing unit 4-7, recording paper 4-8, a conveyor belt 4-9, and a fixing roller 4-10.

In the above-described arrangement, first the laser beam emitted by the semiconductor laser 4-1 is deflected by being reflected by the rotating polygon mirror 4-3, and the deflected beam irradiates the photosensitive drum 4-6 via the focusing system 4-4 and the mirror 4-5. This is a main scanning operation. The photosensitive drum 4-6 rotates by an amount equivalent to one line while one line of main scanning is completed. This a subordinate scanning operation. The image thus formed on the photosensitive drum 4-6 is developed by the developing unit 4-7 and transferred to the recording paper 4-8. The recording paper 4-8 is conveyed by the conveyor belt 4-9 and the image on the recording paper is fixed by the fixing roller 4-10.

The elements of the subordinate scanning system, namely the photosensitive drum 4-6, developing unit 4-7, conveyor belt 4-9 and fixing roller 4-10 are driven synchronously by a conveyance motor (not shown) via gears, belts, etc. (not shown).

The resolution of the image recorded by the LBP will now be described.

First, resolution in the main-scanning direction is decided by how many dots are flashed by the semiconductor laser 4-1 while the laser beam is scanned one line by the polygon mirror 4-3. More specifically, a change in resolution can be achieved by changing the flashing speed of the semiconductor laser 4-1 (resolution is raised by raising the flashing speed) or by changing the rotating speed of the polygon mirror 4-3 (resolution is raised by slowing down the polygon mirror).

Resolution in the sub-scanning direction is decided by how much the photosensitive drum 4-6 rotates while one line of main scanning is carried out. More specifically, a change in resolution can be achieved by changing the rotating speed of the conveyance motor (not shown) which drives the photosensitive drum 4-6 (resolution is raised by slowing down the motor).

By way of example, in a case where it is desired to make the main-scanning and sub-scanning resolutions $D_x$ and $D_y$ multiples of the default state, respectively, the flashing speed of the semiconductor laser 4-1 should be made $D_x$ times the default per line for the main-scanning direction, and the rotating speed of the conveyance motor (not shown) should be made $1/D_y$ of the default for the auxiliary-scanning direction. Though the ranges of the values of Dx, Dy are arbitrary, the ranges adopted are those which will not cause deterioration of the image recorded by the LBP.

An example of the LBP control circuit which performs the foregoing control will now be described with reference to FIG. 5.

Figure 5:
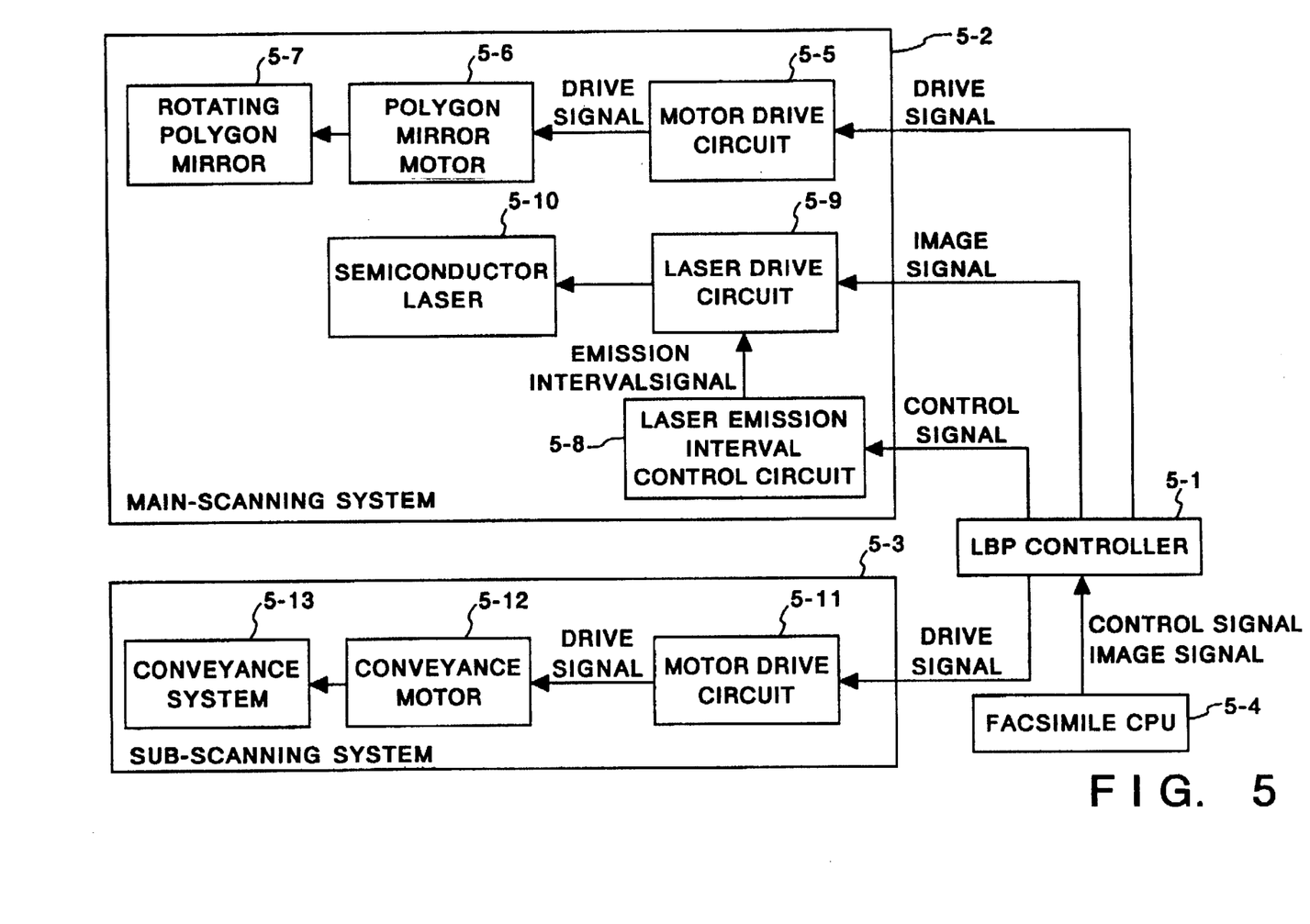
FIG. 5 is a block diagram showing an LBP control circuit in the facsimile apparatus of the present embodiment.

As shown in FIG. 5, the control circuit includes a main-scanning system controller 5-2, a sub-scanning system controller 5-3, and a controller 5-1 for the LBP. In response to a control image signal from a CPU 5-4 of the facsimile apparatus, the LBP controller 5-1 controls the main-scanning system controller 5-2 and the sub-scanning system controller 5-3.

The main-scanning system controller 5-2 controls the main-scanning system by three signals (a drive signal, image signal and control signal) from the LBP controller 5-1. In accordance with this control, a motor drive circuit 5-5 drives a polygon-mirror motor 5-6 by the drive signal, thereby rotating a rotational polygon mirror 5-7. A laser emission interval control circuit 5-8 outputs a light emission interval signal in response to the control signal, and a laser drive circuit 5-9 drives a semiconductor laser 5-10 based on this output signal and the image signal.

The sub-scanning system controller 5-3 controls the sub-scanning system by a drive signal from the LBP controller 5-1. In accordance with this control, a motor drive circuit 5-11 drives a conveyance motor 5-12 by the drive signal, thereby revolving and transporting an actual conveyance system 5-13.

When a signal for altering recording resolution is provided by the CPU 5-4 of the facsimile apparatus, the LBP controller 5-1 delivers the control signal to the main-scanning system controller 5-2 and the laser emission interval control circuit 5-8 in dependence upon the given resolution. In response to this output, the laser emission interval control circuit 5-8 provides the laser drive circuit 5-9 with a signal which changes the laser emission interval, thereby controlling the laser emission interval. The LBP controller 5-1 outputs the drive signal to the motor drive circuit 5-11 of the sub-scanning controller 5-3, thereby changing the rotating speed of the conveyance motor 5-12.

The recording resolution of the LBP can be changed by performing the control described above.

A specific example of setting the recording resolution of an LBP when the foregoing control is carried out will now be described.

By way of example, if the document to be received is size A3 and the resolution is 200 dpi, and if the size of the recording paper is A4, the amount of information per line in the main-scanning direction will be 297 mm×200 bits/inch÷25.4 mm/inch≈2339 bits. In order to fit all of this image information onto one line of A4-size paper, it will suffice to raise and set the resolution to 283 dpi. Specifically, the calculation is 2339 bits×25.4 mm/inch÷210 mm≈283 bits/inch.

Similarly, the figure will be 283 dpi with regard to the sub-scanning direction. In case of a combination with another recording paper size, it will suffice to calculate the necessary resolution by the same method and then set this resolution.

By setting and controlling the LBP recording resolution as described above, compressed recording can be performed without reducing the received image information.

Operation at reception according to the embodiment will be described in accordance with the flowchart shown in FIG. 6.

First, when the connecting unit 1-5 detects an incoming call via the communication line 1-6, a reception operation is started in accordance with the protocol of the facsimile apparatus (step S14). Next, the size and resolution of the document to be received are received (step S15), and it is determined whether the received size is such that the entire image can be recorded intact on the recording paper (step S16). If the result of the determination is that the size is recordable, a transmission instruction which will cause transmission to be performed at the size of the recording paper is sent to the transmitting side (step S17). Thereafter, an ordinary reception operation is carried out (steps S18 through S20).

In a case where the size of the document to be received is such that the entire image cannot be recorded on the recording paper without a size reduction, a transmission instruction for transmission at the size of the manuscript is sent to the transmitting side (step S21). Next, control of the recording resolution of the LBP is carried out as described above to set a recording resolution in such a manner that the size of the manuscript to be received will be reduced to the actual size of the recording paper (step S22). Thereafter, ordinary reception control is carried out (steps S18 through S20).

In a case where the size of the manuscript to be received is large, the resolution high and the size of the recording paper small, there will be instances where the setting of recording resolution for the purpose of reduction will exceed the actual resolving capability of the LBP. Such a situation can dealt with by reducing the paper size of the manuscript to be received to a range within which recording is possible, and lowering the reduction ratio.

More specifically, assume that three types of paper size are A3, B4 and A4, that the manuscript is size A3, 300 dpi, and that the LBP recording paper size is A4, with the maximum resolution being 400 dpi. When it is attempted to receive size A3 under such circumstances, the resolution will be 425 dpi according to the foregoing method, thereby exceeding the resolving power of the LBP. In other words, if the size of the paper to be received is made B4 in a case such as this, the recording resolution will be 347 dpi, thus allowing recording to be performed.

Thus, by making the size to be received the largest possible within the scope of the LBP capability and raising the reduction ratio, image information can be recorded in the largest possible amount.

Figure 6:
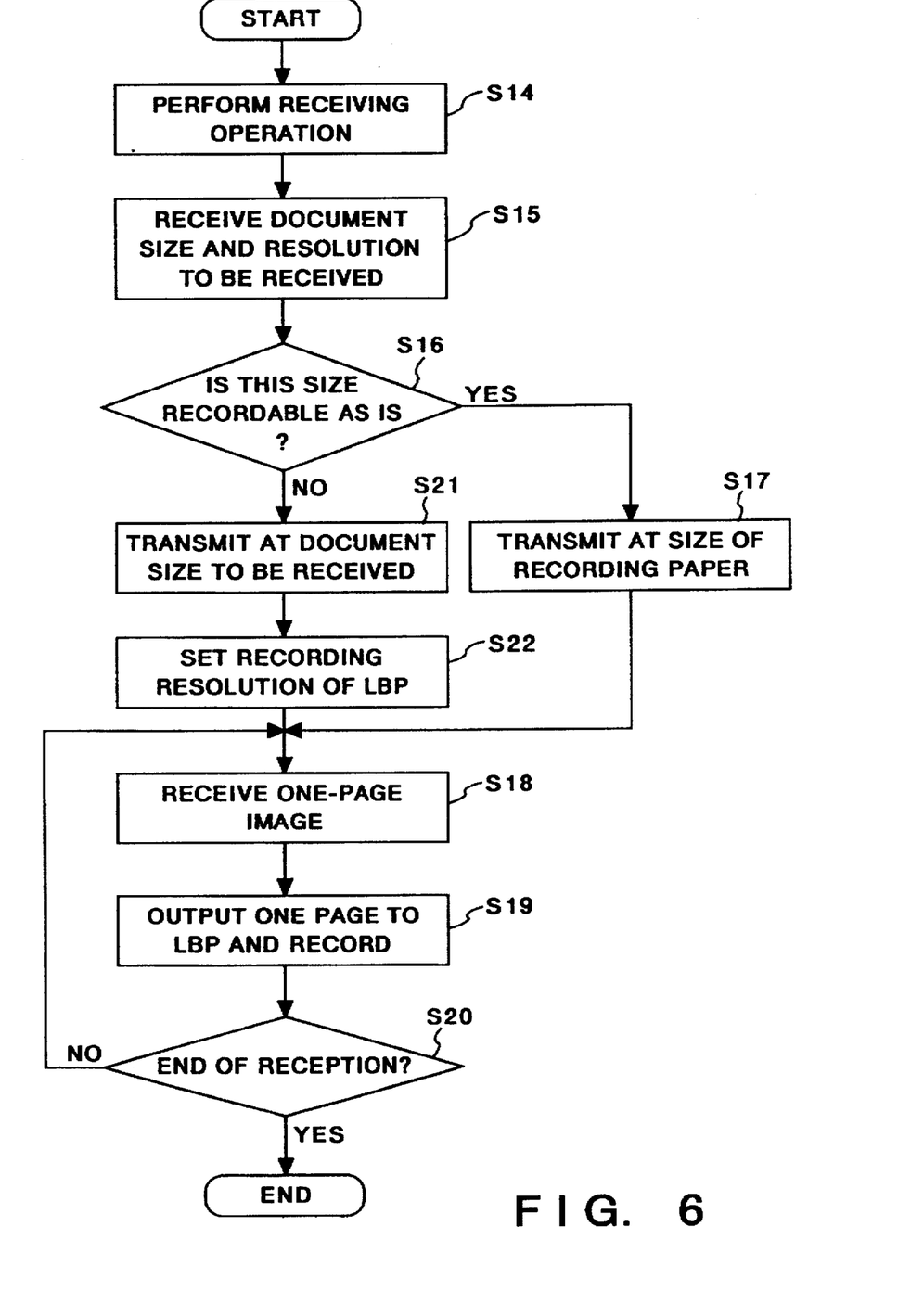
FIGS. 6 and 7 are flowcharts illustrating a receiving operation in the present embodiment.
Figure 7:
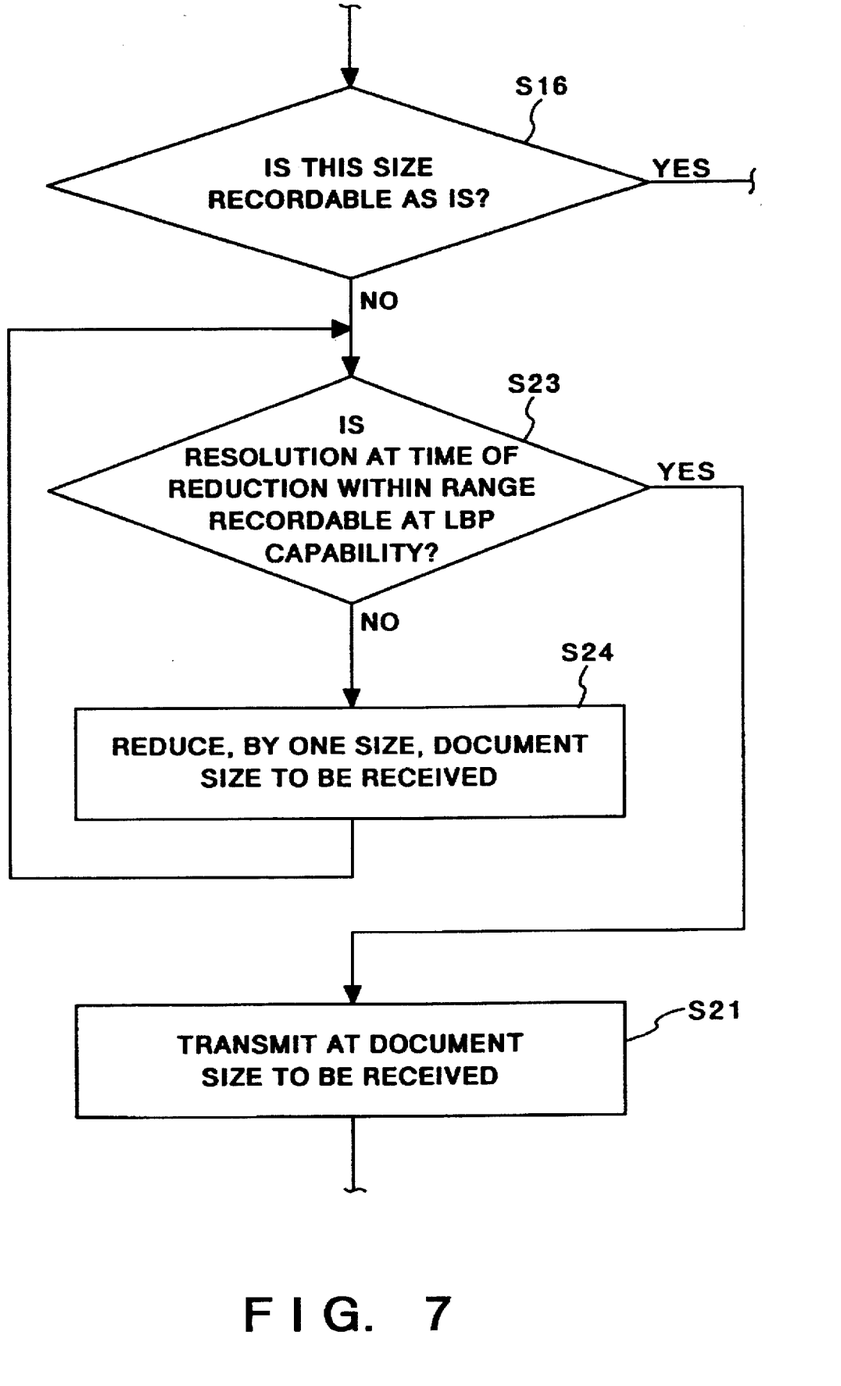

The foregoing control is the flowchart shown in FIG. 7 and is carried out between step S16 and S21 shown in FIG. 6.

In accordance with the present embodiment, means for controlling the recording resolution of an LBP are provided, reception is performed at the size of the manuscript to be received, which size is larger than the actual recording paper size, and the LBP recording resolution is raised, thereby making output at reduced size possible without executing image data processing. As a result, a deterioration in image quality caused by image data processing can be prevented.

Since the facsimile apparatus on the transmitting side can be of the conventional type, no compatibility problems arise.

Furthermore, by selecting the reception mode in such a manner that resolution at the time of reduction will not exceed the resolving capability of the LBP, image data can be reduced to the utmost.

In the embodiment described above, resolution is altered by changing the emission interval of the semiconductor laser and the conveyance speed. However, resolution can be altered by changing the rotating speed of rotating the polygon mirror. Such control can be performed half tones or color characters.

In a case where there is a difference in paper format, as from legal-size paper to letter-size paper, the main-scanning and sub-scanning resolutions can be changed in conformity with the paper format, or a reduction can be performed in conformity with the paper side having a large reduction ratio so as not to cause a deformity in the image.

In the foregoing embodiment, changing the reception mode for the purpose of lowering the reduction rate is carried out by changing the paper size. However, it is permissible to change the image reading resolution on the transmitting side or to combine two types of resolution.

In accordance with the present invention as described above, there are provided a facsimile apparatus and a recording method therein, in which resolution can be modified and set in conformity with the size of the received image information without executing image data processing, and image information is recorded at the set resolution, thereby preventing a deterioration in image quality.

As many apparently widely different embodiments of the present invention can be made without departing from the spirit and scope thereof, it is to be understood that the invention is not limited to the specific embodiments thereof except as defined in the appended claims.

What is claimed is:

1. A device which controls a recording means for recording an image in any of a plurality of recordable resolutions on a recording paper having a size, comprising:

specifying means for specifying a size and resolution of an image to be transmitted from an image information transmitting apparatus based on data from the image information transmitting apparatus;

first judging means for judging whether or not the specified size of the image specified by said specifying means corresponds to the size of said recording paper;

second judging means for judging whether or not, in a case where said first judging means judges that the specified size does not correspond to the size of said recording paper, the image of the specified size can be reduced to be within the size of said recording paper by setting a resolution at the recording means, the set resolution being one of the recordable resolutions and being different from the resolution specified by said specifying means; and requesting means for requesting an image of reduced size from the image information transmitting apparatus, in a case where said second judging means judges that the image of the specified size cannot be reduced to be within the size of said recording paper.

2. The device according to claim 1, wherein said device has a facsimile function.

3. An image forming apparatus comprising:

recording means for recording an image in any of a plurality of recordable resolutions on a recording paper having a size;

specifying means for specifying a size and resolution of an image to be transmitted from an image information transmitting apparatus based on data from the image information transmitting apparatus;

first judging means for judging whether or not the specified size of the image specified by said specifying means corresponds to the size of said recording paper;

second judging means for judging whether or not, in a case wherein said first judging means judges that the specified size does not correspond to the size of said recording paper, the image of the specified size can be reduced to be within the size of said recording paper by setting a resolution at said recording means, the set resolution being one of the recordable resolutions and being different from the resolution specified by said specifying means; and requesting means for requesting an image of reduced size from said image information transmitting apparatus, in a case where said second judging means judges that the image of the specified size cannot be reduced to be within the size of the recording paper.

4. The apparatus according to claim 3, wherein said apparatus has a facsimile function.

5. The apparatus according to claim 3, wherein said recording means performs recording by a laser-beam printer.

6. The apparatus according to claim 4, wherein the resolution is controlled in main-scanning and sub-scanning directions by changing a flashing speed of a semiconductor laser in said laser-beam printer and a rotating speed of a conveyance motor.

7. The apparatus according to claim 4, wherein the resolution is controlled by changing a rotating speed of a rotating polygon mirror in said laser-beam printer.

* * * * *

UNITED STATES PATENT AND TRADEMARK OFFICE
CERTIFICATE OF CORRECTION

PATENT NO. : 5,708,512
DATED : January 13, 1998
INVENTOR(S) : Haruo Ishizuka

It is certified that error appears in the above-identified patent and that said Letters Patent is hereby corrected as shown below:

IN THE DRAWINGS:

SHEET 4

FIG. 5, "INTERVALSIGNAL" should read --INTERVAL SIGNAL--.

COLUMN 4

Line 13, "mm+283" should read --mm=283--.

COLUMN 5

Line 27, "half tones" should read --in half tones--.

UNITED STATES PATENT AND TRADEMARK OFFICE
CERTIFICATE OF CORRECTION

PATENT NO.   : 5,708,512
DATED        : January 13, 1998
INVENTOR(S)  : Haruo Ishizuka It is certified that error appears in the above-identified patent and that said Letters Patent is hereby corrected as shown below:

<u>COLUMN 6</u>

```
Line 51, "claim 4," should read --claim 5,--;
Line 56, "claim 4," should read --claim 5,--.
```

Signed and Sealed this

First Day of September, 1998

*Attest:*

BRUCE LEHMAN

*Attesting Officer*   Commissioner of Patents and Trademarks